(12) United States Patent
Brechon

(10) Patent No.: US 10,543,990 B2
(45) Date of Patent: Jan. 28, 2020

(54) AUTOMATIC FRONT AND REAR LIFT SELF-PROPELLED AGRICULTURAL CONVEYOR

(71) Applicant: Gerald A. Brechon, Dixon, IL (US)

(72) Inventor: Gerald A. Brechon, Dixon, IL (US)

(73) Assignee: AG Automation, Inc., Dixon, IL (US)

( * ) Notice: Subject to any disclaimer, the term of this patent is extended or adjusted under 35 U.S.C. 154(b) by 0 days.

(21) Appl. No.: 16/003,906

(22) Filed: Jun. 8, 2018

(65) Prior Publication Data

US 2019/0152714 A1 May 23, 2019

Related U.S. Application Data

(60) Provisional application No. 62/589,404, filed on Nov. 21, 2017.

(51) Int. Cl.
*B65G 41/00* (2006.01)
*B65G 21/12* (2006.01)

(52) U.S. Cl.
CPC .......... *B65G 41/008* (2013.01); *B65G 21/12* (2013.01); *B65G 41/002* (2013.01); *B65G 2201/04* (2013.01)

(58) Field of Classification Search
CPC ................ B65G 41/008; B65G 41/002; B65G 2201/04; B65G 41/001; B65G 41/005; B65G 41/007
USPC ............................................. 198/318, 316.1
See application file for complete search history.

(56) References Cited

U.S. PATENT DOCUMENTS

| | | | | |
|---|---|---|---|---|
| 2,389,759 A | * | 11/1945 | Blank ................. | B65G 41/002 198/320 |
| 3,563,364 A | * | 2/1971 | Arndt .................. | B65G 41/002 198/304 |
| 4,739,868 A | * | 4/1988 | Head ................... | B65G 41/002 198/316.1 |
| 6,283,269 B1 | * | 9/2001 | Mayer ................. | B65G 41/005 198/313 |
| 8,118,151 B1 | * | 2/2012 | Jesse ................... | B65G 33/14 180/16 |
| 8,317,013 B2 | * | 11/2012 | Sanders .............. | B65G 41/005 198/313 |
| 8,733,533 B1 | * | 5/2014 | Duran ................. | B65G 21/12 198/316.1 |
| 2003/0010600 A1 | * | 1/2003 | Speers ................ | B65G 41/005 198/300 |
| 2004/0060798 A1 | * | 4/2004 | Grundl ................ | E01C 19/48 198/314 |
| 2012/0146314 A1 | | 6/2012 | Kaeb et al. | |

(Continued)

FOREIGN PATENT DOCUMENTS

EP       2883819 A1 *  6/2015  ........... B65G 41/008
KR   10-2000-0042257 A   7/2000

OTHER PUBLICATIONS

Ray-Man, Inc.; SS-429 Portable Fertilizer Belt Conveyor; 7 pages printed from the internet; known prior to Nov. 21, 2017.

*Primary Examiner* — Mark A Deuble
(74) *Attorney, Agent, or Firm* — Reinhart Boerner Van Deuren P.C.

(57) ABSTRACT

An agricultural conveyor is provided. The agricultural conveyor includes a self-propelled chassis. A conveyor is carried by the self-propelled chassis. The front end of the conveyor is configured to be raised and lowered automatically.

19 Claims, 13 Drawing Sheets

(56) References Cited

U.S. PATENT DOCUMENTS

2015/0336747 A1 11/2015 Teichrob et al.
2019/0112132 A1* 4/2019 McCloskey .......... B65G 41/008

* cited by examiner

AUTOMATIC FRONT AND REAR LIFT SELF-PROPELLED AGRICULTURAL CONVEYOR

CROSS-REFERENCE TO RELATED PATENT APPLICATION

This patent application claims the benefit of U.S. Provisional Patent Application No. 62/589,404, filed Nov. 21, 2017, the entire teachings and disclosure of which are incorporated herein by reference thereto.

FIELD OF THE INVENTION

This invention generally relates to agricultural equipment and more specifically to agricultural conveyors.

BACKGROUND OF THE INVENTION

Agricultural conveyors move fungible product from one location to another. For example, agricultural conveyors are utilized to move fertilizers such as phosphates or pot ash from a hopper at the bottom of a semi-truck trailer up to an implement for transport or application. Current agricultural conveyors are generally towed into position which greatly limits where the conveyors can be used in any practical way. Other problems with these current agricultural conveyors include manually having to adjust their pitch or height or both relative to the ground to reach the agricultural implement, trailer or loft they are loading to or receiving from. Such manual effort results in lost time and costly labor. Also, because agricultural applications have limited windows where the weather permits applications in the field, such slow processes can result in lost production because the optimal times for application may be based on field/crop maturity, and if applications are not timely, for example, not completed before rains saturate a field, the application window may be lost which results in lost crop.

The time it takes to tow the current conveyors results in lost production time. First the conveyor must be hitched to a tractor or other means of transport, then unhitched once in position. Further, once the conveyors are moved to the desired location, for example, in the field under a semi-trailer hopper, it becomes difficult to maneuver the conveyors into position under the hopper. Such conveyors are towed to station such that their receiving end is transverse to the semi-trailer longitudinal axis. The conveyor is then unhitched. Thereafter, the tractor that has towed the conveyor is moved to the opposite side of the trailer, the conveyor is then re-hitched and pulled under the hopper for receipt of such items as fertilizer. This is a slow laborious process. The ability to move in a forward and reverse direction is extremely limited because often times the chassis with its wheel base cannot operate in fields with deep top soil or wet top soil. Further, their front ends remain on the ground allowing them to be moved on hard pavement, but not in the field. Thus, in practice these conveyors are moved by towing.

Additionally, such conveyors do not allow for the front end of the conveyor to be automatically lifted to an optimum height under the hoppers of the trailers. By automatic it is meant that an operator merely actuates a control which in turn actuates a motor to do the work required such as lifting or forward and reverse movements. For example, a driver of a car merely actuates a gas pedal which in turn facilitates the flow of fuel to an engine so as to automate the driving process. Contrast this with a manual means of motion where a driver of a bicycle must utilize pedals to turn gears and a chain to set the tires of the bicycle in motion and move the bike forward. Accordingly, in a manual process no motor is utilized. Another example of automatic as used herein is an operator who actuates a lever which in turn ports hydraulic fluid driven by a motor. This is considered "automatic" as opposed to an operator of car who experiences a flat tire and utilizes a jack to lift the car. The jack may utilize a hydraulic cylinder but no motor is involved in the jacking process as the operator uses the strength and repetitive movements of his arm(s) to jack and hence such action is considered a manual means.

Manually lifting either a front end of a conveyer to reach a hopper of a truck is very troublesome particularly where fertilizer is being moved from the hopper to the conveyor. Locating a receiving end of the conveyor too low under the hopper means the fertilizer is likely to spill on the ground given the increased dispersion area with distance from the hopper. Lost product is costly especially with costly fertilizer. Still further, fertilizers do not evacuate hoppers when their exit gates are opened with any uniform consistency in either quantity or velocity. Indeed, the fertilizer may exit slowly until a rush of fertilizer exits, only to slow again, resulting in spurts of an on-again, off-again flow stream. Some conveyors provide a manual means to lift the front end to a desired height under the hopper to account for the amount of fertilizer that falls on the conveyor. These manual front end lifting/jacking means are simply not able to be utilized in any practical fashion out in the field where muddy conditions may exist and uneven terrain. Indeed, in such field conditions where such manual front end jacking means are employed, the front end of the conveyor sinks into the rich, loose and sometimes wet soil making it difficult, if not impossible, to raise and lower the front ends. Accordingly, these conveyors are limited to applications where transfer from the hoppers on the semi-trailers can only occur on paved surfaces.

Yet additional problems are found in known conveyors for use with items such as fertilizer. For example, as discussed above, because the rate and amount of fertilizer dispensed from hoppers is not uniform, the receiving portion of these conveyors does not allow for the variable flow onto the conveyor and is not able to control the amount of fertilizer that passes from the receiving end of the conveyor to a second, top, end of the conveyor vertically well above the receiving area. Because the amount of fertilizer is not well controlled, if at all, the fertilizer falls down the top to the bottom of the conveyor slowing the evolution of moving the fertilizer even further.

BRIEF SUMMARY OF THE INVENTION

Embodiments of the invention provide a new and innovative automatic front and rear lift self-propelled agricultural conveyors, (hereinafter, "agricultural conveyor"). Embodiments of the agricultural conveyor allow for a driver operator to mount the agricultural conveyor to move via its own propulsion system over agricultural fields and from one field to the next, as well as being able to operate on paved surfaces. A self-propelled chassis carrying a conveyor is able to turn the agricultural conveyor a full 360 degrees. The self-propelled chassis has a drive train driving rear wheels while including front and rear wheels that permit steering in agricultural fields. By self-propelled chassis it is meant that the chassis includes a motor to provide a means to drive wheels on the chassis so as to provide means to move the chassis via the motor in at least a forward or reverse direction.

Other advantages of the agricultural conveyor include a front end that is able to be raised and lowered relative to the ground to accommodate receiving such items as fertilizer from the hopper of a semi-trailer. Additional advantages are found in its conveyor which has a vertical portion that is automatically able to be raised and lowered; that is, its pitch can be increased or decreased to accommodate the heights of the various implements it must reach to convey the product it is moving.

Still further, in an embodiment, the construction of the agricultural conveyor is in stainless steel, by way of a non-limiting example, the stainless steel is utilized where the corrosive materials such as fertilizers may come into contact with the conveyor. Further, the invention provides for innovative centering means to keep its conveyor belt centered as it moves product. Additionally, the invention provides for an advantageous receiving area for its conveyor to both receive product such as fertilizers, and to move it to a port that controls the amount of fertilizer moving up the conveyor.

Yet another advantage of the agricultural conveyor is that it provides an operator platform at a single location where an operator may actuate controls for automatic control of the propulsion means of the self-propelled chassis, steering of the chassis, speed and direction of a belt of the conveyor, means to raise and lower the front end of the conveyor and means to raise and lower the rear end of the conveyor are provided.

Further, in the event a motor of the self-propelled chassis is inoperable, connection means are provided on the chassis for utilizing standard auxiliary hydraulic power to drive the belt of the conveyor and raise and lower the front end, rear end or both.

These and other advantages of embodiments of the invention, as well as additional inventive features, will be apparent from the description of the invention provided herein. Such advantages alone, and in combination, greatly decrease the cost of labor and the amount of labor required to operate the conveyor in the field. Moreover, because of these features alone, and in combination, the conveyor self-propelled chassis greatly decreases the time required to complete applications in the field which allows for greater crop production.

In one aspect, an embodiment of the invention provides an agricultural conveyor. The agricultural conveyor includes a chassis and a conveyor arrangement connected to the chassis. The agricultural conveyor also includes a front axle arrangement pivotably connected to the chassis and an actuation means connecting the chassis and the front axle arrangement. An actuation force from the actuator means applied to the front axle arrangement raises a front end of the conveyor arrangement.

In an embodiment, the front axle arrangement includes a pair of caster wheels mounted on opposite sides of a front axle, a pair of top pivot bars mounted on opposite sides of the front axle and a pair of bottom pivot bars mounted on opposite sides of the front axle. The pairs of top and bottom pivot bars are pivotably mounted to the chassis.

In an embodiment, the chassis includes a pair of lug tires mounted on opposite sides of a frame rear end of the chassis.

In an embodiment, the actuation means exert an actuation force on the pair of bottom pivot bars to lift a front end of the conveyor arrangement.

In an embodiment, the actuation means are a pair of hydraulic actuators.

In an embodiment, the front end lowers towards ground with removal of the actuation force.

In an embodiment, the conveyor arrangement rotates about a chassis rotation axis defined by the pair of lug tires when the front end is raised or lowered.

In an embodiment, a motor mounted on the chassis drives the pair of lug tires to move the agricultural conveyor over the ground in a forward and backward direction.

In an embodiment, the chassis includes an operator station wherein an operator standing in the operator station drives and steers the agricultural conveyor.

In an embodiment, the chassis comprises a vertical portion pivotably attached to a horizontal portion, a slideable receiver mounted on the vertical portion of the chassis slides along opposed sides of the conveyor arrangement to raise and lower the rear end.

In an embodiment, a cable and winch system mounted on the chassis moves the slideable receiver to lift a rear end of the agricultural conveyor.

In an embodiment, raising the front end lowers a rear end of the conveyor.

In another aspect, an embodiment of the invention provides an agricultural conveyor. The agricultural conveyor includes a chassis defining an axis of rotation. The agricultural conveyor also includes a conveyor arrangement carried by the chassis. The conveyor arrangement has a front end and rear end. The front end is located below the rear end. The agricultural conveyor also includes a front axle arrangement connected to the chassis. At least one actuator is operably coupled between the chassis arrangement and the front axle arrangement. The at least one actuator is operable to rotate the chassis about the axis of rotation to change a height of the front end of the conveyor relative to ground.

In an embodiment, changing the height of the front end changes a distance from the ground of a rear end of the agricultural conveyor arrangement.

In an embodiment, the front axle arrangement includes a first pair wheels mounted on opposite sides of a front axle and a pair of top pivot bars. The pair of top pivot bars is connected pivotably to the chassis. The front axle arrangement also includes a pair of bottom pivot bars. The pair of bottom pivot bars is connected pivotably to the chassis. The conveyor arrangement is interposed between the pair of top pivot bars and is interposed between the pair of bottom pivot bars.

In an embodiment, the chassis includes a second pair of wheels located on opposite sides of a rear end of the chassis. The chassis is drivable on the first and second pair of wheels.

In another aspect, an embodiment of the invention provides an agricultural conveyor. The agricultural conveyor includes a chassis arrangement providing a first pair of wheels and a conveyor arrangement carried by the chassis. A front axle arrangement is connected to the chassis. The front axle arrangement provides a second pair of wheels. The agricultural conveyor is drivable on the first and second pairs of wheels. The front axle arrangement includes a pair of top pivot bars. The pair of top pivot bars is connected pivotably to the chassis. The front axle arrangement further includes a pair of bottom pivot bars. The pair of bottom pivot bars is connected pivotably to the chassis arrangement. The conveyor arrangement is interposed between the pair of top pivot bars and is interposed between the pair of bottom pivot bars.

In an embodiment, actuation means connect the chassis and the front axle arrangement. An actuation force from the actuator means applied to the front axle arrangement raises a front end of the conveyor arrangement and lowers a rear end of the conveyor arrangement.

In an embodiment, the actuation force is applied to the pair of bottom pivot bars to raise the front end of the conveyor arrangement.

In an embodiment, the actuation means are operable to rotate the chassis about the axis of rotation in a first direction to raise the front end relative to ground and in a second direction to lower the front end.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
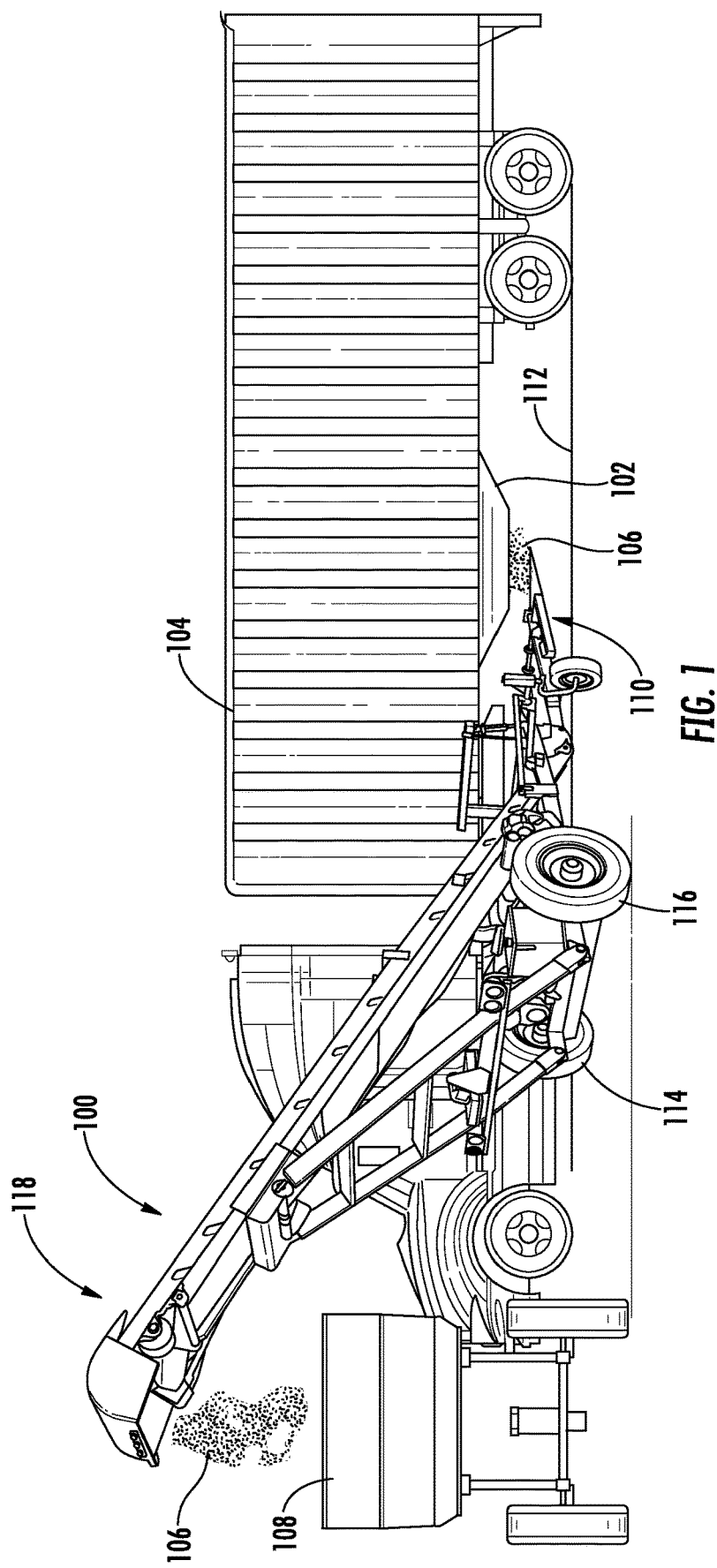
FIG. 1 is a left side rear perspective view of an embodiment of an agricultural conveyor having a front end above ground according to the teachings of the present invention.

FIG. 1 illustrates an embodiment of an agricultural conveyor 100 according to the teachings of the present invention in use under a hopper 102 of a semi-trailer 104 for loading product 106 into a wagon 108. While the embodiments reference an agricultural conveyor 100, it can be readily appreciated from inspection of FIG. 1 that other uses are certainly envisioned, by way of a non-limiting example, use in a quarry for moving rock.

FIG. 1 illustrates innovative features of embodiments of the instant invention. For example, the agricultural conveyor 100 has a front end 110 that can be automatically lifted to be raised or lowered relative to the ground 112 to optimize the most efficient receipt of the product 106. FIG. 1 illustrates the front end 110 raised above the ground 112. This is particularly important when product 106 received from the hopper 102 by the agricultural conveyor 100 is fertilizer. If the agricultural conveyor 100 is too far below the hopper 102 then the pattern and/or force of impact of the fertilizer on the agricultural conveyor 100 can cause the fertilizer to fall off or not even reach the agricultural conveyor 100. Such spilled fertilizer can result in possible environmental harm and certain economic loss as the fertilizer is spilled onto the ground 112.

Accordingly, optimization of the height above the ground 112 and below the hopper 102 facilitates efficient receipt of fertilizer or any other intended product 106 at the front end 110. Further, allowing the front end 110 to be automatically raised keeps the front end 110 off the ground 112 so that the agricultural conveyor 100 can be driven through wet and muddy fields with an operator aboard. Previous agricultural conveyors had to be towed into position and even if their tires could be mechanical driven they were much too small and incapable of traversing acres of muddy fields where they were needed to receive product such as fertilizer. Not only were their tires and drive trains to small but their front ends could only be lifted via jacking mechanisms, that is manually, and thus could not be lifted above the ground when driving over muddy fields. Hence, they would get stuck and require tow to lift their front ends and move them into the desired locations in the field.

However, embodiments of the instant application advantageously provide large lug tires 114, 116 with a drive train that permits the agricultural conveyor 100 with its front end 110 raised off the ground 112 to be driven through uneven and muddy terrain without being towed. Further, whereas previous conveyors when they reached the hopper of a trailer in a muddy field had to be unhitched from their tow. The tractor pulling the conveyor would then be positioned on the other side of the trailer. Thereafter, the front end of the conveyor was reconnected to the tractor and towed under the hopper. Once in position the tractor was again unhitched from the conveyor while the front end of the conveyor was manually jacked up, that is raised to the desired height below the hopper. All these steps were again repeated in reverse to move the conveyor to the next hopper.

A further advantage of embodiments of the instant application includes a rear end 118 of the agricultural conveyor 100 that can be automatically raised or lowered to accommodate the height of the carrier wagon 108. Thus, the agricultural conveyor 100 advantageously includes self-propulsion to allow an operator to drive the agricultural conveyor 100 in areas hereto for unreachable without towing. This greatly decreases the time to position the agricultural conveyor 100 under the hopper 102. Time on task is further decreased because the front end 110 and the rear end 118 that can be automatically raised and lowered.

Figure 2:
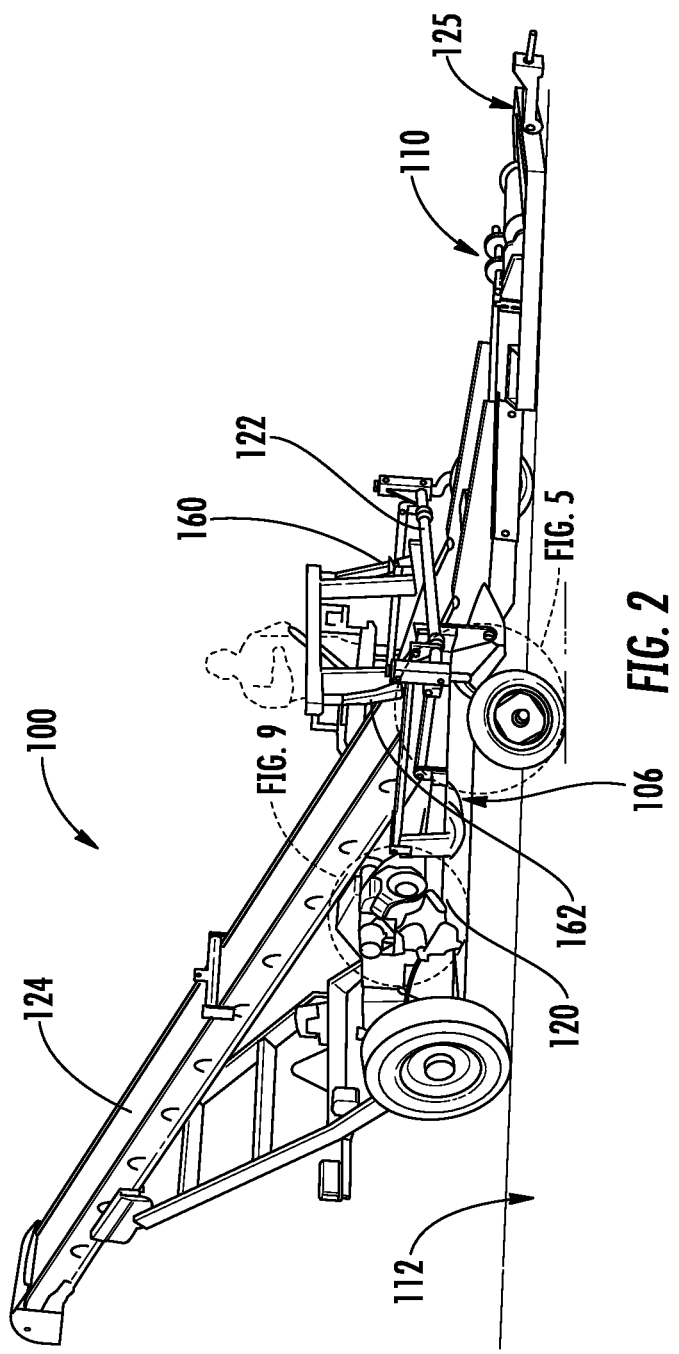
FIG. 2 is a left side perspective view of the embodiment of FIG. 1 but with a front end on the ground.

FIG. 2 is a left side view of the agricultural conveyor 100 of FIG. 1 but with the front end 110 resting on the ground 112, also referred to as a first state. Agricultural conveyor 100 includes a chassis 120 also referred to as a self-propelled chassis 120, a front axle arrangement 122, a conveyor arrangement 124 and may, in certain embodiments, include a hitch 125.

Figure 3:
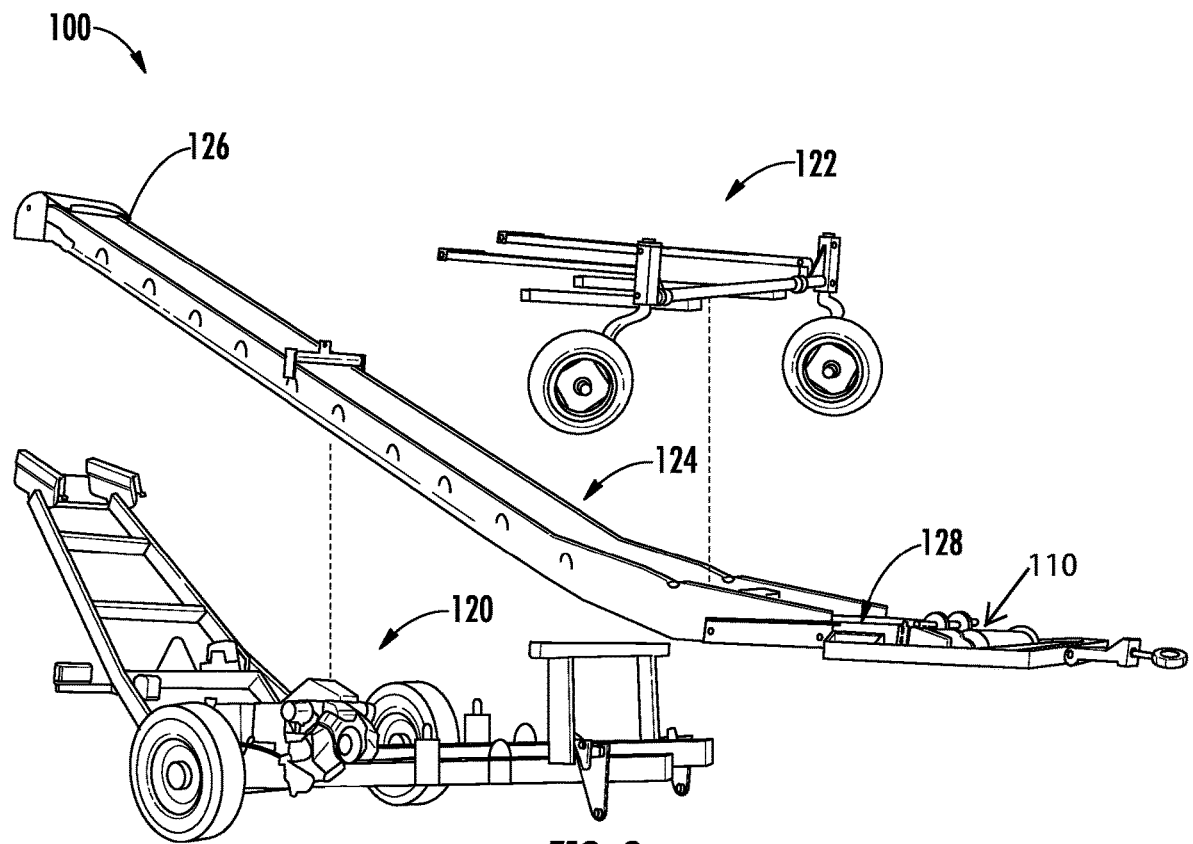
FIG. 3 is an assembly view of the embodiment of FIG. 1.

FIG. 3 is an exploded view of the agricultural conveyor 100 illustrating the self-propelled chassis 120, the front axle arrangement 122 and the conveyor arrangement 124. Self-propelled chassis 120 carries and directly connects to the conveyor arrangement 124. Front axle arrangement 122 pivotably connects to self-propelled chassis 120 to advantageously allow a receiver portion 128 at the front end 110 to be automatically raised and lowered relative to the ground 112 (FIG. 1) Further, the self-propelled chassis 120 advantageously allows for a rear end 126 of the conveyor arrangement 124 to be automatically raised and lowered in height relative to the ground 112 (FIG. 1).

Figure 4:
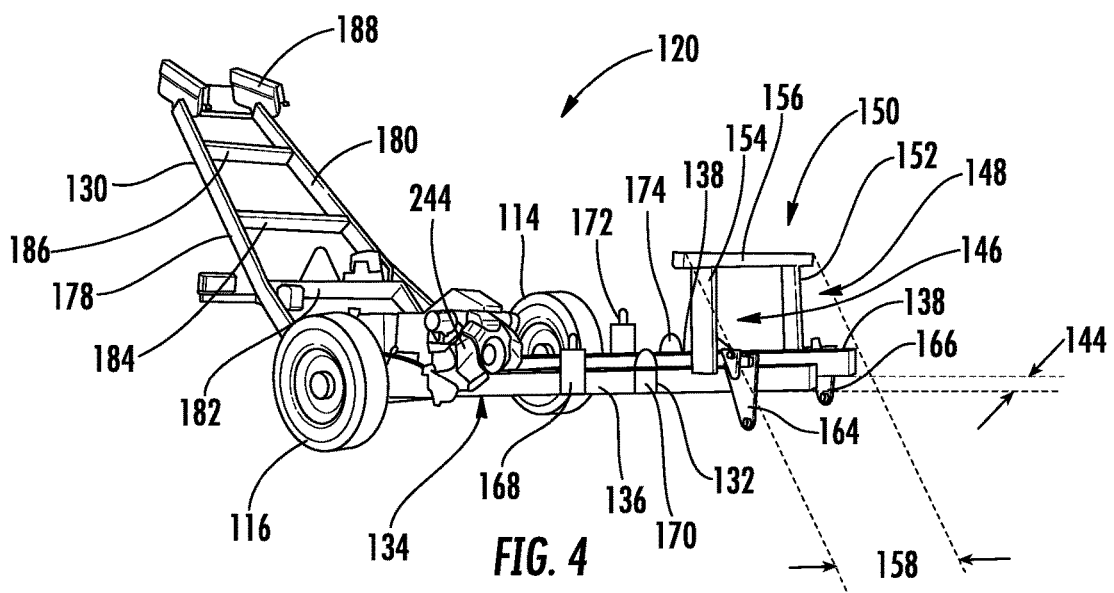
FIG. 4 is a left side perspective view of the self-propelled chassis the embodiment of FIG. 1.

FIG. 4 illustrates self-propelled chassis 120 having a vertical support section 130 and a horizontal base 132. The horizontal base 132 is defined by a frame 134 having a left side longitudinal member 136, a right side longitudinal member 138, and a frame rear end 140 (FIG. 8) defined by a transverse member 142 (FIG. 8) to define a width 144 of the frame 134. A mouth 146 is at a frame front end 148 and is defined by the left and right and left side longitudinal members 136,138 and by a lift 150. Lift 150 has first and second risers 152, 154 extending vertically above the left and right side longitudinal members 136, 138 and capped by a bridge member 156. Bridge member 156 has a bridge width 158 that is greater than the width 144 of the frame 134. Bridge width 158 advantageously provides for the self-propelled chassis to lift the conveyer 124 via actuation means connecting the self-propelled chassis 120 to the front axle arrangement 122 (FIG. 3). The actuation means may comprise an actuator, and in this embodiment a pair of actuators 160, 162 (FIG. 2) which may in preferred embodiments be hydraulic actuators. However, it is not the intent to limit the actuators to hydraulic actuation as other actuators including mechanical, electrical and pneumatic may be used.

At the frame front end 148, extending vertically below each respective left and right left side longitudinal members 136, 138 are mounting elements 164, 166 respectively. Each of the mounting elements 164, 166 define apertures to facilitate connection of the self-propelled chassis 120 to the conveyor arrangement 124.

Figure 5:
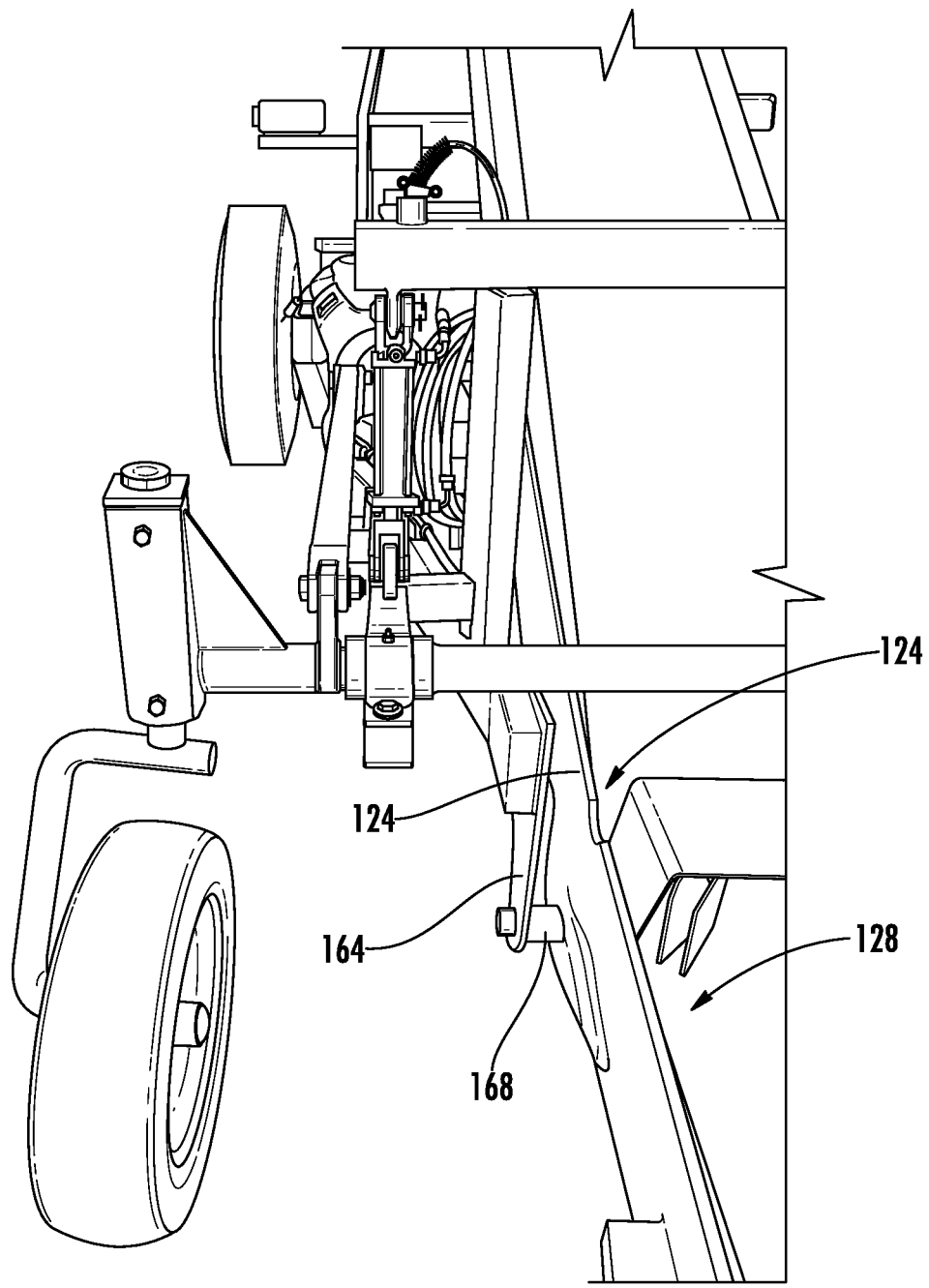
FIG. 5 is an enlarged front left perspective view about area 5 of FIG. 2.

FIG. 5 illustrates mounting element 164 connected to a receiving post 168 of the conveyor arrangement 124 proximate the receiver portion 128 of the conveyor arrangement 124. Although not illustrated, it can be readily understood that mounting element 168 connects in a similar manner to conveyor arrangement 124 on the opposite side of the conveyer arrangement 124. While connection of the self-propelled chassis 120 to the conveyor arrangement 124 is illustrated with mounting element 164 and receiving post 168, it is not the intent to limit connection to only these means, as one can readily appreciate that fasteners such as bolts and or pins to name just a few non limiting examples may be used in various embodiments.

Returning to FIG. 4, first left side and second left side connection blocks 168, 170 are located on left side longitudinal member 136 while first right side and second right side connection blocks 172, 174 are located on right side longitudinal member 138 for pivotably connecting the self-propelled chassis 120 to the front axle arrangement 122 (FIG. 3).

The two lug tires 114,116 are mounted on opposite sides of the frame 134. In certain embodiments, each lug tire 114,116 may be driven independently of the other. For example, hydraulic means permit one lug tire 114 to be driven while the other lug tire 116 remains stationary without rotation; thus permitting the self-propelled chassis 120 to be turned 360 degrees in one direction. Stopping the driven lug tire 114 and driving the second lug tire 116 permits turning in the opposite direction, and thereby advantageously permitting a self-propelled chassis 120 to be turned 360 degrees clockwise or counterclockwise fashion as desired. Thus, self-propelled chassis 120 includes at least the two wheels, lug tires 114, 116. The lug tires 114, 116 may, in an embodiment be AKURET 10.00-20 model tires.

Rearmost ends of left and right side longitudinal members 136, 138 define connection apertures for pivotably connecting vertical support section 130 such that a pivot axis 176 (FIG. 8) is defined through the connection apertures. Vertical support section 130 includes left and right support arms 178, 180 separated by stiffening members 182, 184, 186. As illustrated, left and right support arms 178,180 extend in an inwardly tapering manner away from the pivot axis 176 (FIG. 8) towards a slideable receiver 188. Slideable receiver 188 functions to receive a vertical portion 190 (FIG. 3) of the conveyor arrangement 124 (FIG. 3) in order to both support the conveyor arrangement 124 and to facilitate raising and lowering the conveyor arrangement 124. Frame front end 148 of the self-propelled chassis 120 pivotably connects to the front axle arrangement 122 (FIG. 3).

Figure 6:
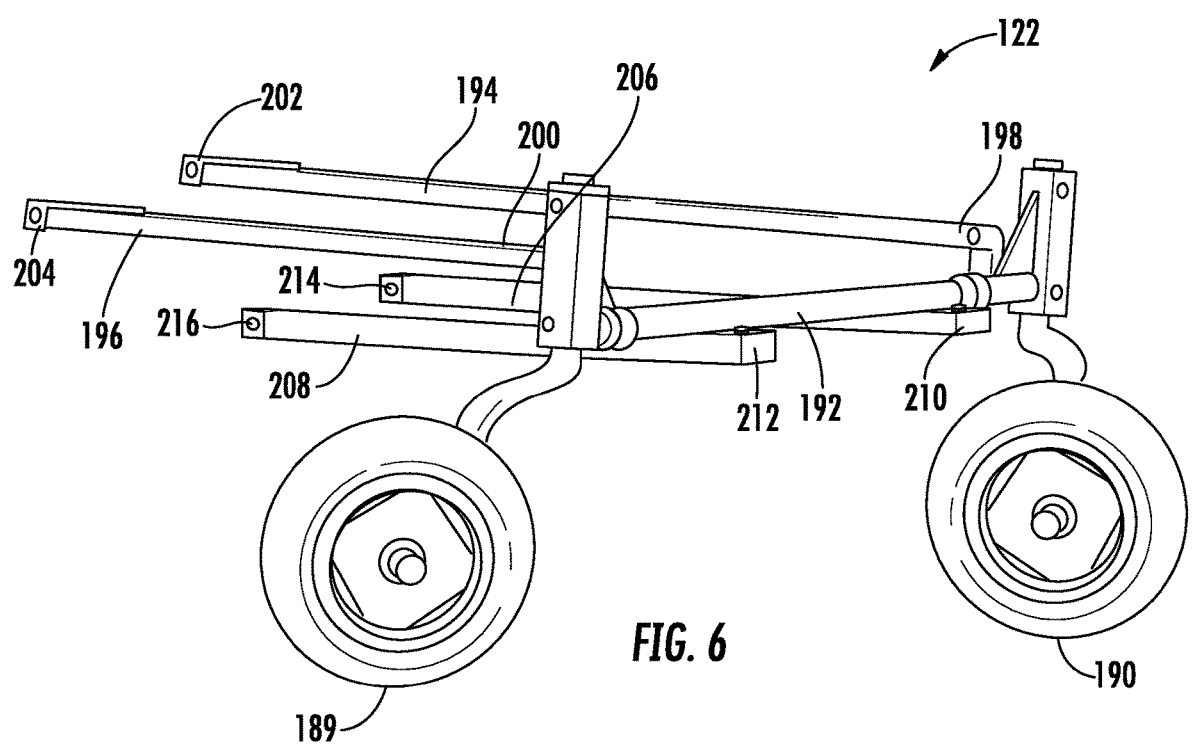
FIG. 6 is a partial perspective view of the front axle arrangement of the embodiment of FIG. 1.

FIG. 6 illustrates the front axle arrangement 122 which includes at least two swivel caster wheels 189, 190 in opposed space relation mounted at opposite end of ends of a front axle 192. The swivel caster wheels 189, 190 are free to swivel 360 degrees about an axis perpendicular to their mounting axis so as to provide for turning of the self-propelled chassis 120 (FIG. 2). Swivel caster wheels 189, 190 cooperate with lug tires 114, 116 (FIG. 4) such that the agricultural conveyor 100 (FIG. 1) can be turned 360 degrees in clockwise or counter clockwise fashion. The lug tires 114, 116 unlike the swivel caster wheels 114, 116 while free to rotate about their mounting axles are not able, when mounted, to rotate about an axis perpendicular to their axles. The ability to quickly and automatically turn decreases time on task, efficiency in labor use, cost and, in some instances, can result in increased crop production from the ability to timely utilize the product conveyed by self-propelled chassis 100.

The front axle arrangement 122 also includes right and left top pivot bars 194,196 having right and left top first ends 198, 200 and right and left top second ends 202, 204 respectively. The front axle arrangement 122 further includes right and left bottom pivot bars 206, 208 having right and left bottom first ends 210, 212 and right and left bottom second ends 214, 216.

Figure 7:
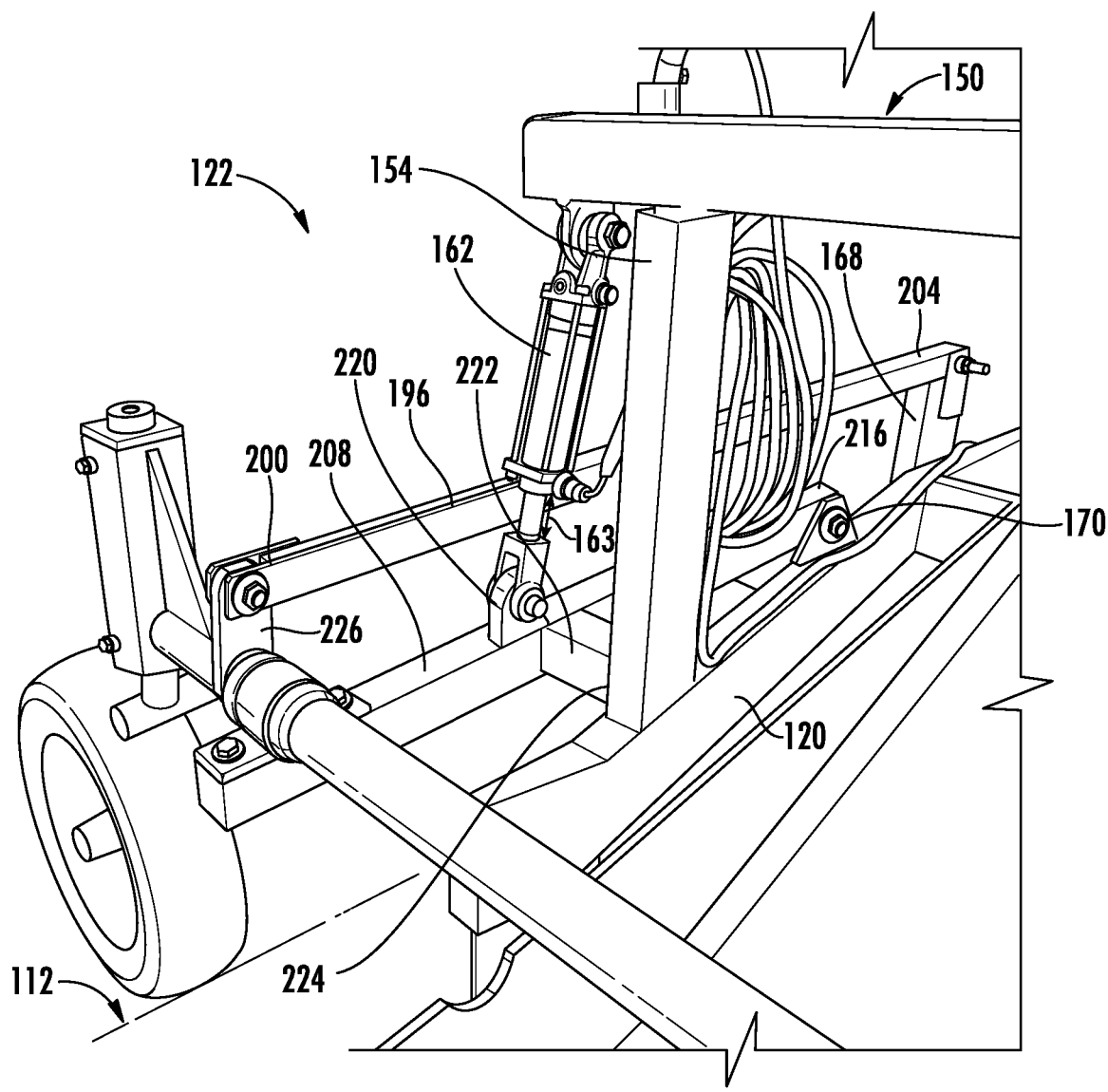
FIG. 7 is an enlarged partial perspective right front view of left side about area 5 of FIG. 2.

FIG. 7 illustrates the front axle arrangement 122 pivotably connected to the self-propelled chassis 120 at its left side. The right side of the self-propelled chassis 120 is connected and operates in a similar manner. With respect to the connection on the left side, left top second end 204 of left top pivot bar 196 pivotably connects to first left side connection block 168 of the self-propelled chassis 120 while left top first end 200 pivotably connects to an extension receiver 226 of the front axle arrangement 122. Left bottom pivot bar 208 at left bottom first end 216 pivotably connects to second left side connection block 170 of the self-propelled chassis 120.

A left spacer 222 has a first end integral with and thus permanently fixed to left bottom pivot bar 208. Left spacer bar 222 has a second end 224 that provides a bearing surface for bearing against second riser 154 as it moves vertically. Thus, left spacer 222 is not connected at its second end 224 to second riser 154. Left spacer 222 advantageously facilitates spacing between left bottom pivot 208 and self-propelled chassis 102 (FIG. 3). This spacing advantageously facilitates the pivoting connection of the front axle arrangement 122 to the self-propelled chassis 120 (FIG. 1) and the rising and lowering of the front end 110. (FIG. 1).

Further illustrated in FIG. 7 is hydraulic actuator 162 connecting lift 150 of the self-propelled chassis 120 to left receiver 220 of the left bottom pivot bar 208. Thus, one can readily appreciate, that when the actuator 162 applies an actuation force, the actuation force pushes down on the front axle arrangement 122. For example, in the embodiment illustrated, as hydraulic fluid ports to a side of a cylinder to create the actuation force, actuator 162 extends a distance 163 resulting in the lifting of frame front end 148 (FIG. 12) of self-propelled chassis 120 which in turn lifts receiving portion 128 (FIG. 5) of the conveyor arrangement 124. Thus, because of the pivotable connections of the front axle arrangement 122 to the self-propelled chassis 120, lift 150 is able to lift the front end 110 (FIG. 12) of the agricultural conveyor 100, and more specifically, lifting the receiving portion 128 of the conveyor arrangement 124. Conversely, when the actuation force is removed, the front end 110 (FIG. 10) is lowered.

Figure 8:
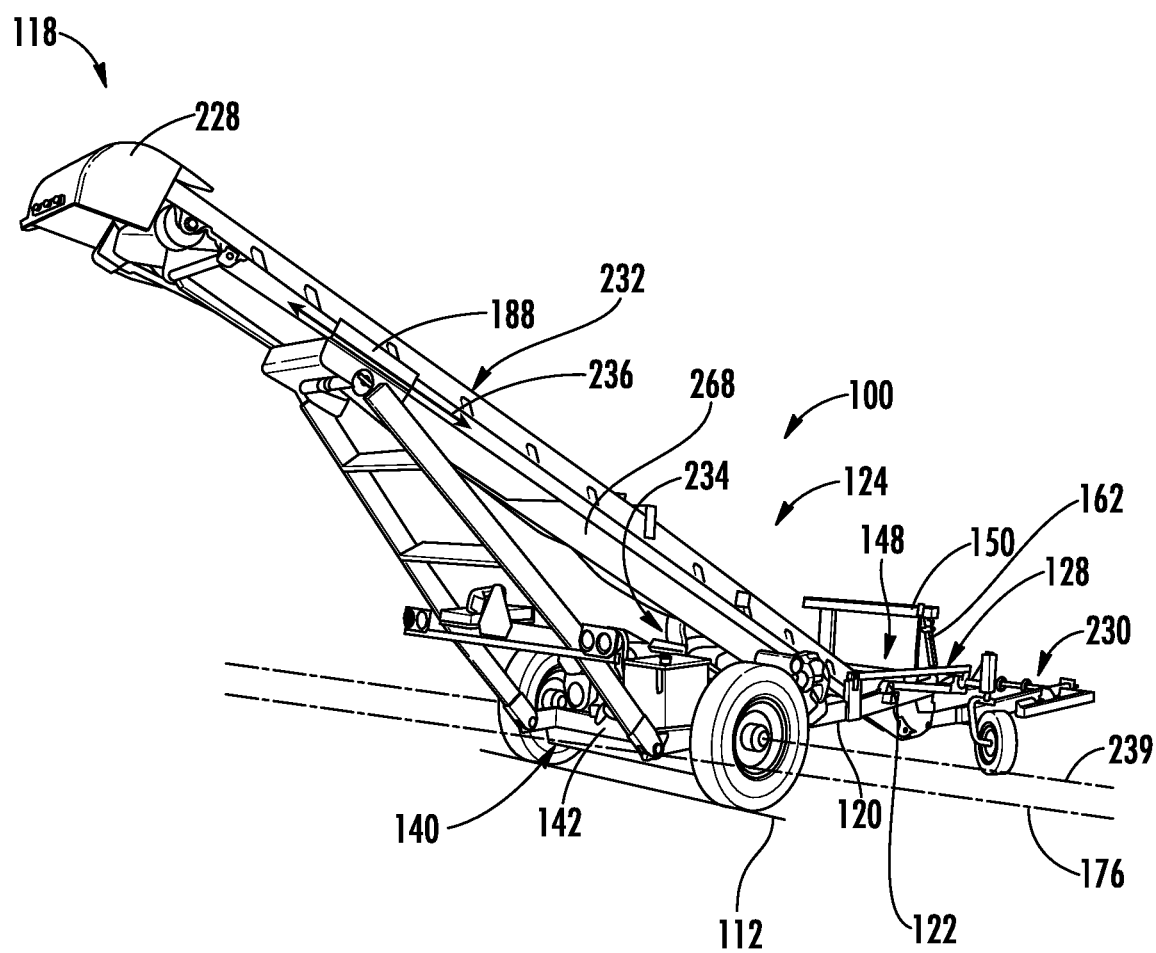
FIG. 8 is a left side rear perspective view of the embodiment of FIG. 1.
Figure 9:
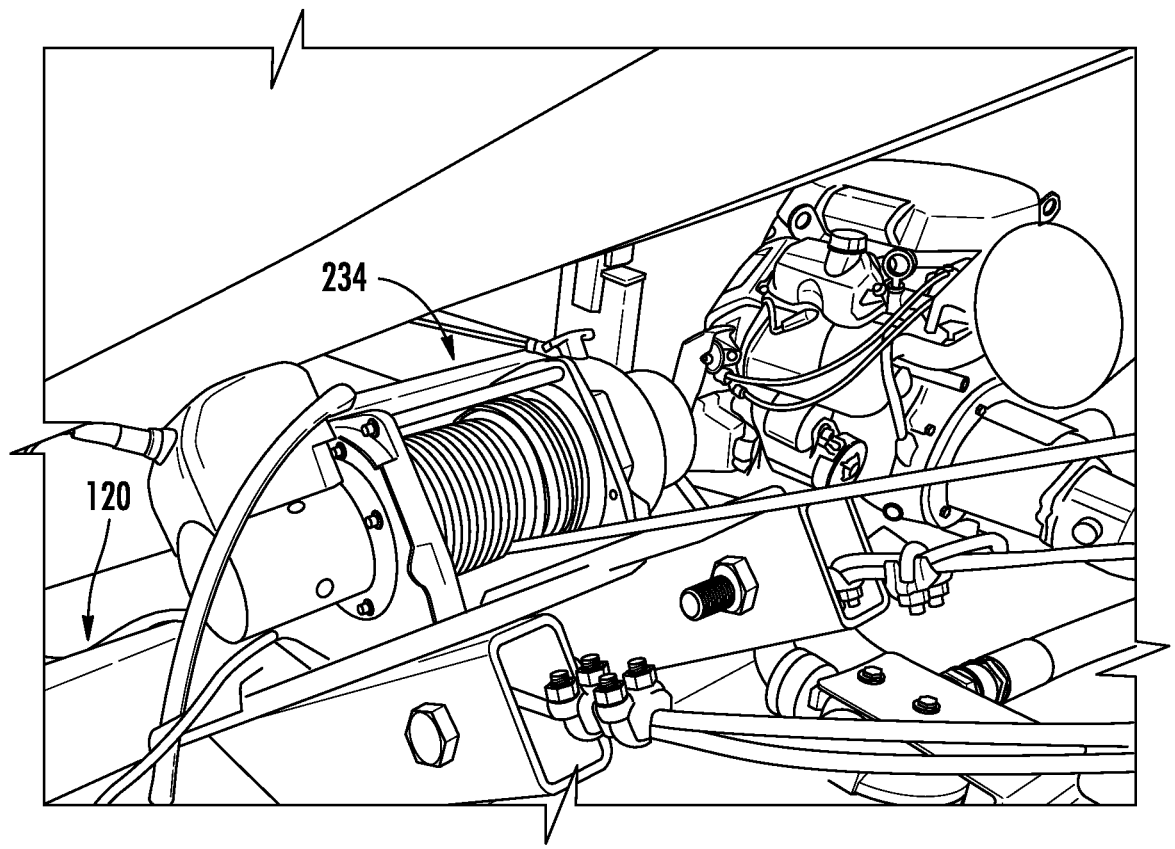
FIG. 9. is an enlarged perspective view of the cable and winch system of the embodiment of FIG. 1.

Turning to FIGS. 8 and 9, FIG. 8 illustrates self-propelled chassis 120 carrying conveyor arrangement 124. Conveyor arrangement 124 includes a deflector shield 228 mounted at the rear end 118 of the agricultural conveyor 100. The conveyor arrangement 124 has a base portion 230 and a vertical portion 232 which are integral with one another, that is, they are not pivotable relative to one another. It is not the intent to limit embodiments of the conveyor arrangement 124 to integral construction as pivotal connections are possible. However, the integral embodiment discussed here, facilitates the advantages heretofore discussed. Vertical portion 232 rests on, and is received into, the sliding receiver 188 of the self-propelled chassis 120.

Figure 14:
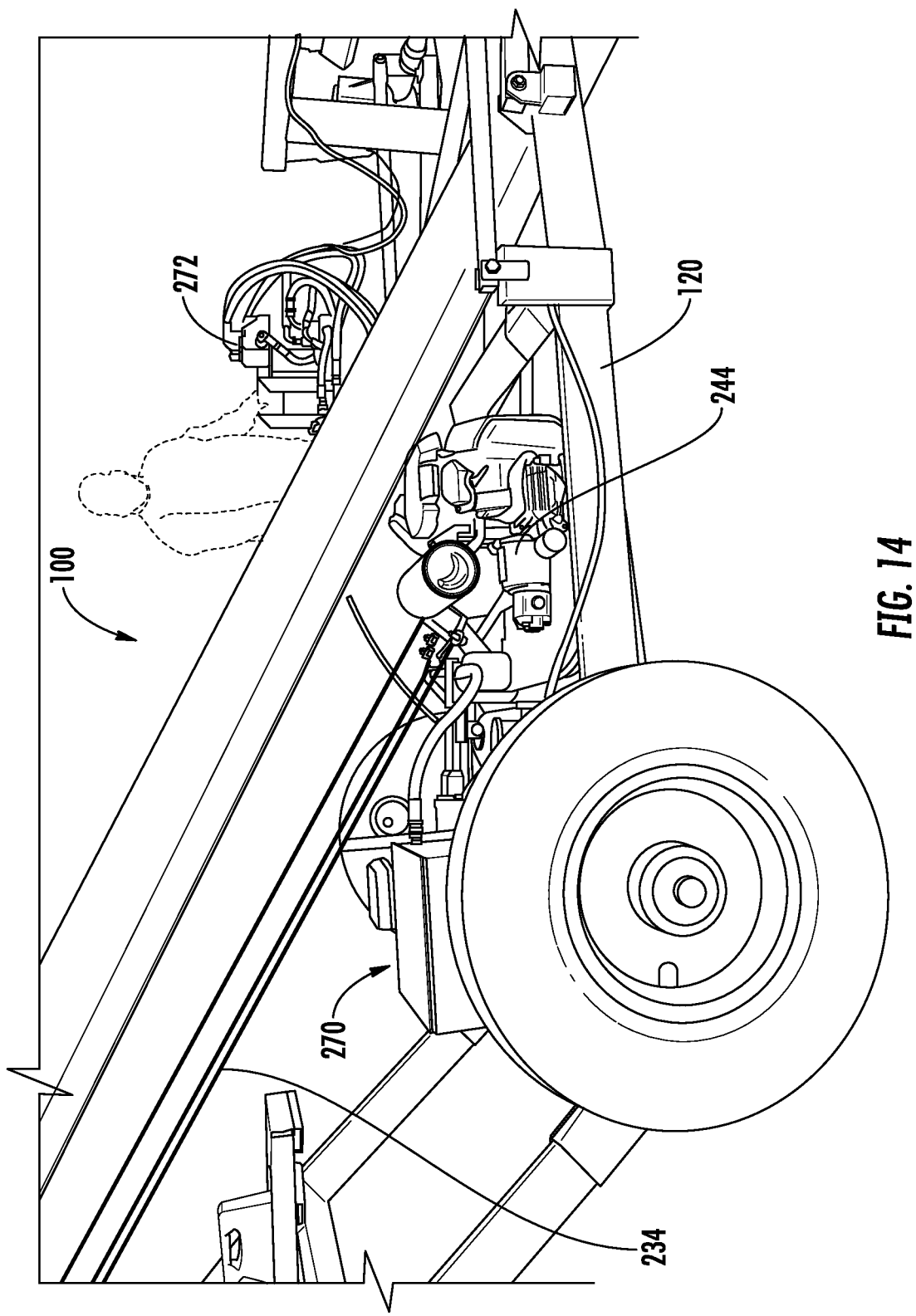
FIG. 14 is an enlarged schematic view about the area 14 of FIG. 12.

A cable and winch system 234 (FIG. 9) is located on self-propelled chassis 120 at one end, and connected to sliding receiver 188. The cable and winch system 234 operates to slide sliding receiver 188 along vertical portion 232 towards the front end 110 to raise the vertical support section 130 of the self-propelled chassis 120 which in turn raises the vertical portion 232 of the conveyor arrangement 124 relative to the ground 112. Thus, slideable receiver 188 slides along the vertical portion 232 in the directions indicated by the arrows at 236. The cable and winch system 134 may be driven hydraulically via a motor, but it is not the intent to limit said cable and winch system 234 to only hydraulic means, for e.g. the motor may operate to utilized pneumatic means, electric means, or mechanical means. Indeed, in a preferred embodiment, the self-propelled chassis 120 carries a battery for powering running lights and the cable and winch system 234 as well as facilitating start of the motor 244 (FIG. 14) providing propulsion to self-propelled chassis 120. Accordingly, it may be said the motor 244 in charging the battery powers the cable and winch system 234.

The ability to automatically raise and lower the vertical portion 232 advantageously saves time and provides for a safer method than manually raising and lowering the vertical portion 232 so as to be able to reach varying heights of farm implements such as wagon 108 (FIG. 1).

Sliding receiver 188, in some embodiments may be made of steel plate; for example, quarter inch steel plate. The upper portion of the steel plate, that is, that face of the plate that faces a heavy duty endless belt 238 (FIG. 10), is coupled to an ultra-high molecular weight polyethylene (UHMW) sheet such that the UHMW sheet is between the heavy duty endless belt 238 and the steel sheet. The coupling may be done utilizing elevator or bucket bolts. The UHMW sheet is heated, which sucks in the head of the bolts into the UHMW sheet such that the bolts cannot contact the heavy duty endless belt 238, and such that the heavy duty endless belt 238, with the weight of product thereon, contacts the UHMW sheet and not the steel plate of the sliding receiver 188. Accordingly, the UHMW sheet advantageously provides a lower coefficient of friction to facilitate rotation of the heavy duty endless belt 238, and further to prevent corrosion of the steel plate of the sliding receiver 188 from corrosive product being transported on the heavy duty endless belt 238 such as fertilizer.

The conveyor arrangement 124 is slideably connected to the vertical portion 232 of the conveyor arrangement 124 proximate the rear end 118 of the agricultural conveyor 100. The self-propelled chassis 120 is connected proximate the receiver portion 128 of the conveyor arrangement 124. It can now be readily appreciated that because the front axle arrangement 122 is pivotably connected only to the self-propelled chassis 120, then when hydraulic actuators 160, 162 at the lift 150 extend they create a force pushing the front axle arrangement 122 to the ground so as to raise the frame front end 148 (FIG. 12) of the self-propelled chassis 120 and thus the receiving portion 128 the conveyor arrangement 124 to which it is attached.

Lug tires 114, 116 define a chassis rotational axis 239 about which the self-propelled chassis 120 rotates as its frame front end 148 (FIG. 12) is raised off the ground 112. As the frame front end 148 of the self-propelled chassis 120 rotates upwards away from the ground 112, the front end 110 of the conveyor arrangement is lifted off the ground 112 while the back end 118 rotates downwards towards the ground 112 all about chassis axis of rotation 239. (FIG. 12) Slideable receiver 188 does not slide along the conveyor arrangement 124 as the back end 118 rotates downwardly towards the ground 112 because it is held in place by the cables of the cable and winch system 134.

The vertical portion 232 of the conveyor arrangement 124 may include stainless steel underside plating 268 such that the heavy duty endless belt 238 rides on top of the underside plating 268 so as to prevent corrosive materials such as fertilizer from falling on the electronics, hydraulics, and motor 244 (FIG. 13) driving self-propelled chassis 120. Further, the stainless steel also may help support the heavy duty endless belt 238, and the weight from the product being moved thereon, and thereby cooperate with centering means 246 (FIG. 10) to center the heavy duty endless belt 238.

Figure 10:
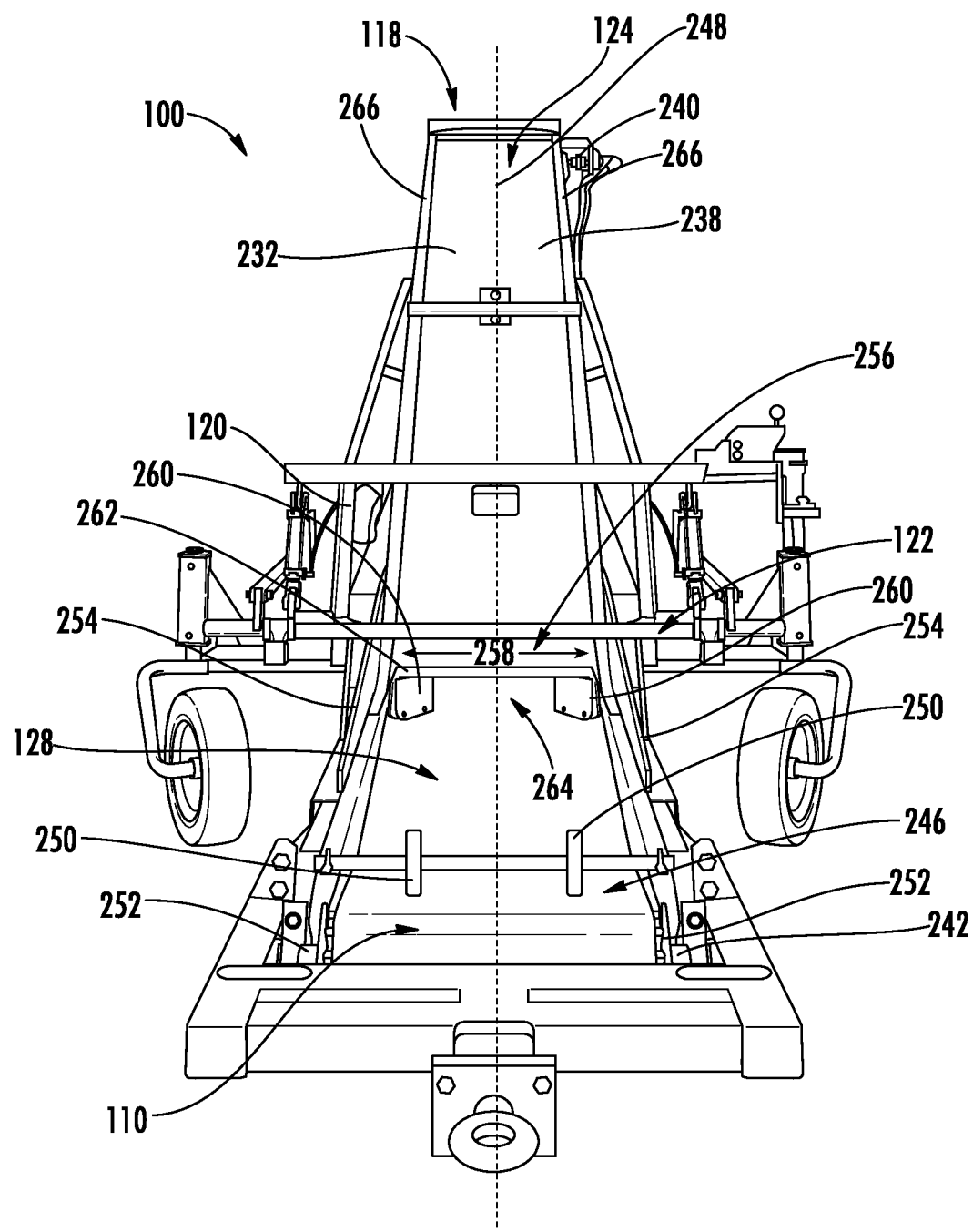
FIG. 10 is a front perspective view of the embodiment of FIG. 2.

FIG. 10 illustrates a front view of the agricultural conveyor 100 with conveyor arrangement 124 connected to self-propelled chassis 120 and self-propelled chassis 120 pivotably connected to front axle arrangement 122. Conveyor arrangement 124 includes a heavy duty endless belt 238 lying over and around at least a driven roller 240 and a front roller 242. Heavy duty endless belt 238 in an embodiment may be made of rubber by way of a non limiting example, however, other materials known in the art for moving such materials as fertilizer and grain may be used. The heavy duty endless belt 238 is sized so as to be able to accommodate the heavy weight of the various materials which it may be required to handle; for example, fertilizers such as phosphate and potash.

The heavy duty endless belt 238 is also configured to operate at variable speed and may be reversible, meaning operable to move materials in a direction from the front end 110 of the agricultural conveyor 100 to the rear end 118 or from the rear end 118 to the front end 110. The variable speed and direction may be accomplished, for example, by providing one or more driven rollers 240 to turn the heavy duty endless belt 238 via hydraulic means powered by a motor 244 (FIG. 4). The driven roller 240 may, in a preferred embodiment be hydraulically driven. Other embodiments may provide for other driving means such as for example electric or mechanical. In any of these cases the motor 244 can be said to power the driven roller 240 even where it may indirectly do so via a hydraulic pump for example. The same can be said for the actuators 160, 162 in that the motor 244 may be said to power the actuators 160, 162 in that it may provide the charge to the electrical system or the power a hydraulic pump or pneumatic compressor etc.

The conveyor arrangement 124 also includes centering means 246 for the heavy duty endless belt 238. The centering means 246 advantageously keeps the heavy duty endless belt 238 aligned along a longitudinal axis 248 of the agricultural conveyor 100 while moving heavy loads of product such as corn or fertilizer. The centering means 246 may include top rollers 250 rolling on the top of the heavy duty endless belt 238 and may also include bearing plates 252 in opposed space relation at either side of the heavy duty endless belt 238 proximate the front roller 242. The bearing plates 252 in a preferred embodiment may be made from steel plate and facilitate centering of the heavy duty endless belt 238.

The conveyor arrangement 124 also includes a receiver portion 128 at the front end 110 of the conveyor arrangement 124. The heavy duty endless belt 238 defines a bottom of the receiver portion 128 such that the sides are slightly cupped to provide a pocket for received product 106 (FIG. 1) to sit in. Sides of the receiver portion 128 are defined by gussets 254 in opposed space relation on opposite sides of the heavy duty endless belt 238. In a preferred embodiment, the gussets 254 are radial gussets. The gussets 254 may be made of steel and are configured via their location and size to direct the accumulated material such as fertilizers along the heavy duty endless belt 238 and under a belt bridge 256 as the materials move from the receiver portion 128 to the vertical portion 232 of the conveyor arrangement 124. The belt bridge 256 defines a rear end of the receiver portion 128.

The belt bridge 256 spans a belt width 258 of the heavy duty endless belt 238. Sides of the belt bridge 256 are connected on opposed sides of the conveyor arrangement 124. Channel guides 260 are connected to the sides and located under a cutter plate 262 in opposed space relation. The channel guides 260 provide faces which function to direct the material on the endless belt 238 into port 264 defined by the channel guides 260 and the cutter plate 262. The faces may in a preferred embodiment be pentagonal to advantageously allow more product 106 (FIG. 1) through the port 264 then rectangular or square faces. Cutter plate 262 acts as a top of the port 264, and functions to control the amount of material; for example, fertilizer, that is able to move from the receiver portion 128 to the vertical portion 232. This is particularly advantageous given the nature of the materials being moved along the conveyor arrangement 124.

For example, where the conveyor arrangement 124 is moving fertilizer, the fertilizer may be particularly heavy as it accumulates on the receiver portion 128. However, the amount that proceeds along and up the vertical portion 232 is metered by the port 264 defined by the cutter plate 262 and channel guides 260. Without this metering, too much material would move from the receiver portion 128 to the vertical portion 232 causing the material transported to merely fall back down the vertical portion 232 towards the receiver portion 128, resulting in both lost material and the slowing down of transportation of the material along the conveyor arrangement 124. The heavy duty endless belt 238 is bounded by side rails 266 in opposed space relation along the sides of the conveyor arrangement 124 and may in a preferred embodiment be made of stainless steel so as to prevent corrosion from the highly corrosive fertilizers that the conveyor arrangement 124 may carry.

Figure 11:
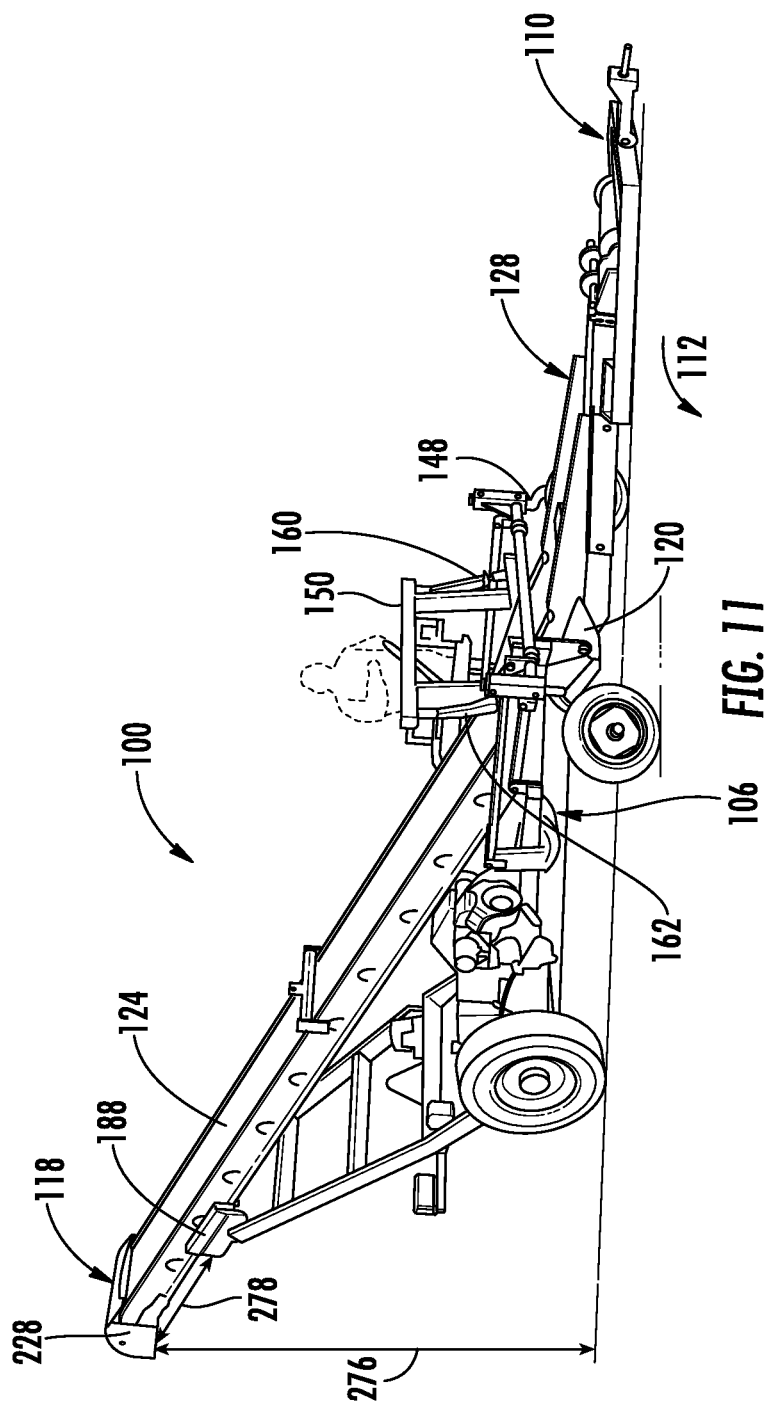
FIG. 11 is a another left side perspective view of the embodiment of FIG. 1 but with the front end in a first state.
Figure 12:
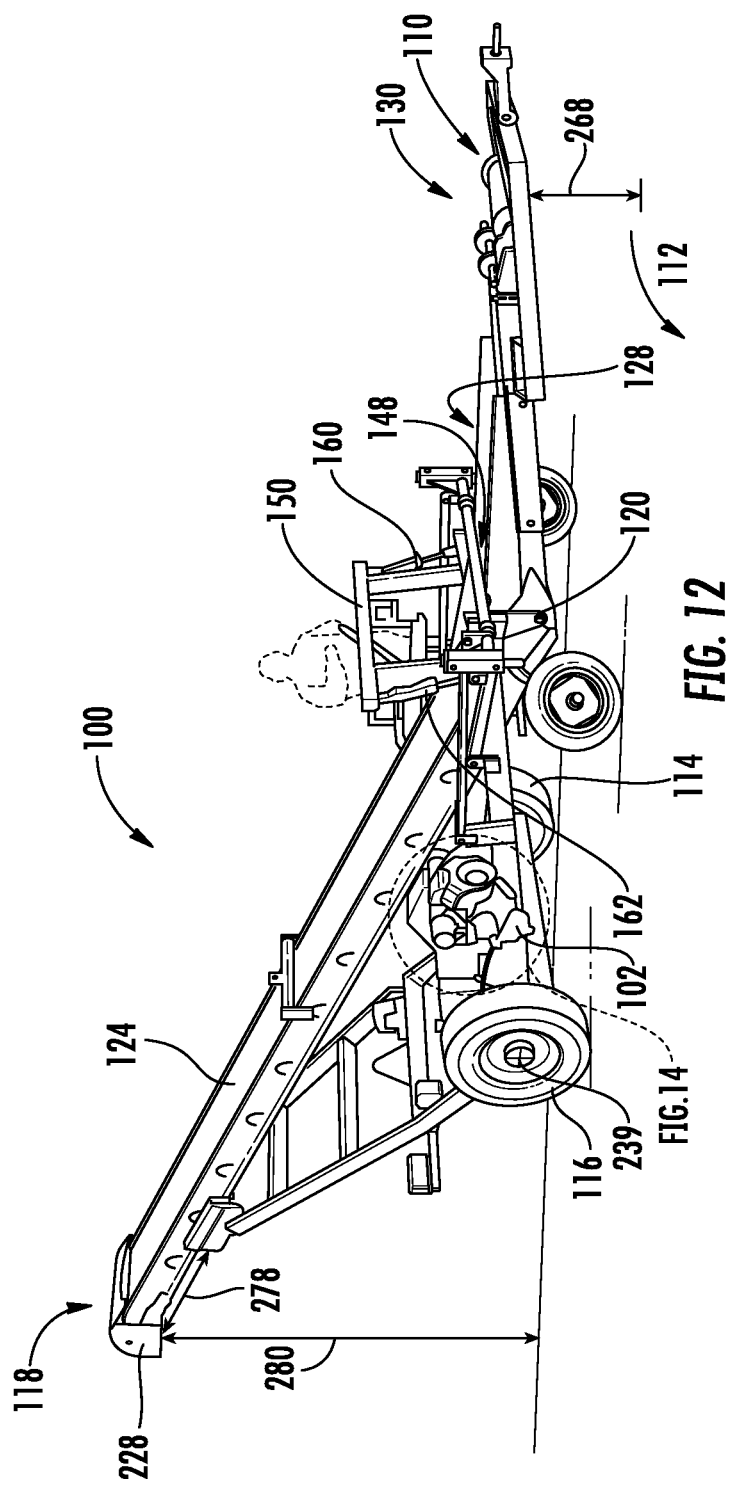
FIG. 12 is another left side perspective view of the embodiment of FIG. 1 with the front end in a second state.

Turning now to FIGS. 11 and 12. FIG. 11 illustrates a left side view of the agricultural conveyor 100 with the front end 110 and the receiver portion 128 in a first state on or nearly on the ground 112 and the rear end 118 in a first state at a height 276 above the ground 112 and the slideable receiver 188 at a first distance 278 away from the deflector shield 228.

FIG. 12 illustrates the left side view of the agricultural conveyor 100 with the front end 110 in a second state raised to a height 268 off of the ground 112. The second state of the front end 110 is reached by lifting the front end 148 of self-propelled chassis 120 via lift 150 with actuators 160, 162 on opposed sides of the lift 150. As previously discussed, this is accomplished when actuators 160, 162 extend. Their extension causes the frame front end 148 of the self-propelled chassis 120 to rotate upwards, that is, counterclockwise about chassis rotational axis 239 away from the ground 112. As the frame front end 148 lifts, the front end 110 of the conveyor arrangement 124 is lifted a distance 268, or any distance therebetween, above the ground 112. Further, while the front end 110 is raised, the rear end 118 rotates downwards towards the ground 112 about the chassis rotational axis 239. Thus, while FIG. 11 shows the rear end 118 at a first height 276 above the ground 112, FIG. 12 shows the rear end 118 at a second height 280 above the ground 112. The second height 280 being less the first height 276 after the frame front end 148 has been lifted. While the self-propelled chassis 120 has rotated about chassis rotational axis 239, slideable receiver 188 has not moved and thus its distance 278 away from deflector shield 228 remains the same as that in FIG. 11.

Figure 13:
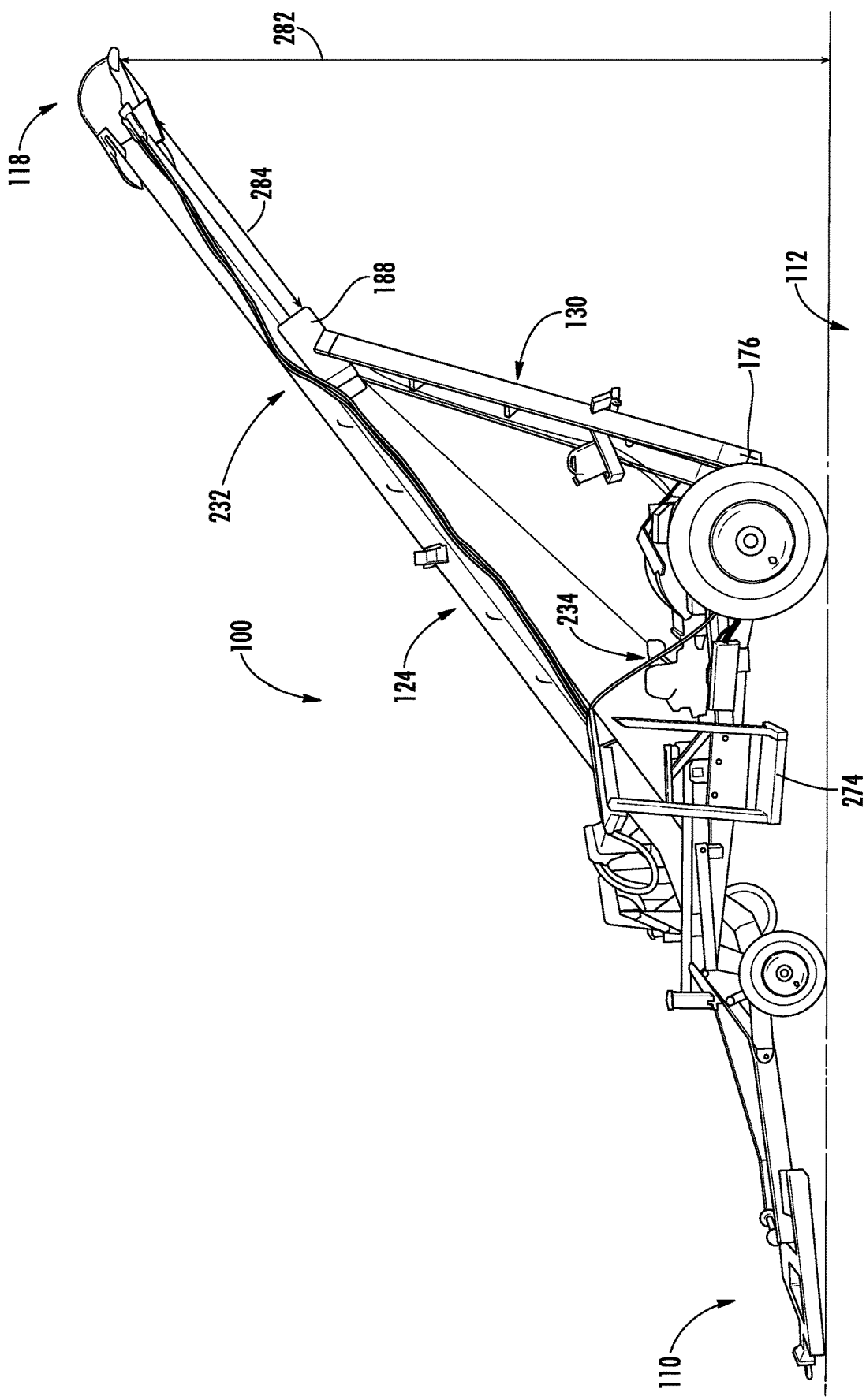
FIG. 13 is a right side perspective view of the embodiment of FIG. 1 with the rear end at a maximum height above ground.

FIG. 13 illustrates the agricultural conveyor 100 with the rear end 118 having been raised to a third height 282 by use of the cable and winch system 234 after the front end 110 is in its second state raised to height 268, that is, as illustrated in FIG. 12. With the front end 110 raised in its second state to height 268 or some height therebetween, that is ground and height 268, the cable and winch system 234 is activated to pull the slideable receiver 188 towards the front end 110 and away from the deflector shield 228 a distance 284. Movement of slideable receiver 188 is along the vertical portion 232 of the conveyer 124 such that the vertical support section 130 of the self-propelled chassis 120 pivots, that is rotates in a first direction about pivot axis 176. Distance 284 is greater than distance 278 (FIG. 11). Indeed distance 284 represents a maximum attainable height above ground 112 for the rear end 118. As the rear end 118 is raised, the conveyor arrangement 124 rotates in the first direction about a second rotation axis defined by receiving post 168 of the conveyor arrangement 124 to allow the rear end 118 to raise while the front end 110 lowers to the ground.

Conversely, with the front end 110 already on the ground, as in FIG. 11, as the cables of the cable and winch system 234 pay out, the slideable receiver 188 slides toward the deflector shield 228 and the vertical support section 130 of the self-propelled chassis 120 pivots in a second direction, opposite the first direction to lower the rear end 118. As the rear end 118 lowers, the front end 110 is raised above ground 112 without having to utilize, that is actuate, the actuators, 160, 162. Indeed, as the vertical support section 130 pivots in the second direction, the conveyor arrangement 123 rotates in the second direction about receiving post 168 allowing the rear end 118 to lower while the front end 110 is raised above the ground 112.

This is means of raising the front end 110 and lowering the rear end 110 without having to activate the actuators 160, 162 is particularly advantageous in preparation for towing or driving operations over the road wherein an operator need only activate the cable and winch system 234 to lower the rear end 118 to create a lower vertical profile for passage under overpasses or bridges or garage doors or where lifting the front end 110 the height of the hitch may be easily accomplished by simply paying out the cable and winch system 234 and allowing the conveyor arrangement 124 to rotate in the second direction about the receiving post 168 of the conveyor arrangement 124. Thus, when the front end 110 is on the ground 112 and the actuators 160, 162 are not extended, as in FIG. 11, the cable and winch system 134 can pay out cable to allow the slideable receiver 188 to move towards the deflector shield 228 such that the rear end 118 moves towards the ground 118 as the vertical support section 130 of the self-propelled chassis 120 rotates about pivot axis 176 due to the weight of the conveyor arrangement 124 which in turn allows for rotation about the second pivot axis to allow the front end 110 to lift.

Another advantage of the embodiment illustrated in FIGS. 11-13 of agricultural conveyor 100 is that lift 150 of the self-propelled chassis 120 is provided with hydraulic actuators 160, 162 to automatically lift the front end 110 of the agricultural conveyor 100 and hence the receiver portion 128 off of the ground 112 or conversely to lower the front end 110 to the ground 112. Further, as the conveyor arrangement 124 is loaded, its receiver portion 128 height above ground 112 may be continually adjusted as needed to optimize the delivery of product on the conveyor arrangement 124.

Indeed, as is understood by those in the art, the difficulty with receiving materials such as fertilizer from such hoppers is that the fertilizer does not flow in a continuous controlled rate, but rather flows in an inconsistent fashion, making it difficult to control the amount of fertilizer that is received in the receiving portion 128 of the conveyor arrangement 124. Accordingly, the ability to raise and lower the front end 110 of the conveyor arrangement 124 together with the gussets 254 (FIG. 10) and the port 264 (FIG. 10) with its cutter plate 262, as well as channel guides 260 (FIG. 10), advantageously allow for the control of the amount of fertilizer as well as the rate of the fertilizer moving along the conveyor arrangement 124.

As discussed above, the ability to automatically lift the front end 110 from a first state, that is a lowered state on the ground 112, to a raised second state or any height therebetween allows for the front end 110 of the agricultural conveyor 100 to be easily placed under a hopper 102 (FIG. 1) of a semi-trailer 104 (FIG. 1). Additionally, the ability to lift the front end 110 into a second state, that is a raised state, advantageously permits for optimal placing of the receiver portion 128 of the conveyor arrangement 124 under the hopper 102 (FIG. 1). Still further, keeping the front end 110 off the grounds 112 permits the self-propelled chassis 120 to be driven over difficult terrain such as muddy farm fields.

Self-propelled chassis 120 may be driven by various propulsion systems including a gas powered motor 244 (FIG. 14) which may drive hydraulic means (FIG. 14) to power the lug tires 114, 116 to provide propulsion, to turn driven roller 240 (FIG. 10), to move hydraulic actuators 160, 162, and to turn cable and winch system 234 (FIG. 13). Even where the cable and winch system 234 may be electric, the motor 244 charging the electrical system can be understood to power the cable and winch system 234. The controls 272 for actuation of the systems are advantageously located at an operator platform 274 (FIG. 13) on the self-propelled chassis 120. The location of all the controls 272 at the operator platform 274 advantageously permits an operator to selectively drive and steer the self-propelled chassis 120, lift and lower the front end 110 of the conveyor arrangement 124, raise and lower the rear end 118 of the conveyor and drive the driver roller 240 (FIG. 10) without moving from the operator platform 274 (FIG. 13). By selectively it is meant that the operator can choose which systems to engage. For example the operator can drive the agricultural conveyor 100 and then stop. The operator can then raise or lower the front end 110 or choose to raise and lower the rear end 118 as desired. Further, in embodiments utilizing hydraulic drives, and dual motors may be provided to increase both horsepower and speed of the conveyor arrangement 124 and to provide additional power for any of the systems. Other embodiments may provide for multiple types of motors mounted on the chassis, each motor can be configured to perform any operation, for example drive, raise and lower the front end 110 or raise and lower the rear end 118.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An agricultural conveyor, comprising:
a chassis;
a conveyor arrangement connected to the chassis;
a front axle arrangement pivotably connected to the chassis;
actuation means connecting the chassis and the front axle arrangement;
wherein an actuation force from the actuation means applied to the front axle arrangement raises a front end of the conveyor arrangement;
the front axle arrangement comprising:
 a pair of caster wheels mounted on opposite sides of a front axle;
 a pair of top pivot bars mounted on opposite sides of the front axle;
 a pair of bottom pivot bars mounted on opposite sides of the front axle;
 the pairs of top and bottom pivot bars pivotably mounted to the chassis.

2. The agricultural conveyor of claim 1, the chassis comprising a pair of lug tires mounted on opposite sides of a frame rear end of the chassis.

3. The agricultural conveyor of claim 2, wherein a motor mounted on the chassis drives the pair of lug tires to move the agricultural conveyor over the ground in a forward and backward direction.

4. The agricultural conveyor of claim 3, wherein the chassis includes an operator station wherein an operator standing in the operator station drives and steers the agricultural conveyor.

5. The agricultural conveyor of claim 2, wherein the chassis comprises a vertical portion pivotably attached to a horizontal portion, a slideable receiver mounted on the vertical portion of the chassis slides along opposed sides of the conveyor arrangement to raise and lower the rear end.

6. The agricultural conveyor of claim 5, wherein a cable and winch system mounted on the chassis moves the slideable receiver to lift a rear end of the agricultural conveyor.

7. The agricultural conveyor of claim 1, wherein the actuation means exert an actuation force on the pair of bottom pivot bars to lift a front end of the conveyor arrangement.

8. The agricultural conveyor of claim 1, wherein the actuation means are a pair of hydraulic actuators.

9. The agricultural conveyor of claim 1, wherein the front end lowers towards ground with removal of the actuation force.

10. The agricultural conveyor of claim 1, wherein raising the front end lowers a rear end of the conveyor.

11. An agricultural conveyor, comprising:
a chassis;
a conveyor arrangement connected to the chassis;
a front axle arrangement pivotably connected to the chassis;
actuation means connecting the chassis and the front axle arrangement;
wherein an actuation force from the actuation means applied to the front axle arrangement raises a front end of the conveyor arrangement;
wherein the front end lowers towards ground with removal of the actuation force; and
wherein the conveyor arrangement rotates about a chassis rotation axis defined by the pair of lug tires when the front end is raised or lowered.

12. An agricultural conveyor, comprising:
a chassis defining an axis of rotation;
a conveyor arrangement carried by the chassis, the conveyor arrangement having a front end and rear end, the front end located below the rear end;
a front axle arrangement connected to the chassis;
at least one actuator operably coupled between the chassis and the front axle arrangement, the at least one actuator operable to rotate the chassis about the axis of rotation to change a height of the front end of the conveyor relative to ground.

13. The agricultural conveyor of claim 12, wherein changing the height of the front end changes a distance from the ground of a rear end of the agricultural conveyor arrangement.

14. The agricultural conveyor of claim 12, the front axle arrangement comprising
a first pair wheels mounted on opposite sides of a front axle;
a pair of top pivot bars, the pair of top pivot bars connected pivotably to the chassis;
a pair of bottom pivot bars, the pair of bottom pivot bars connected pivotably to the chassis; and
wherein the conveyor arrangement is interposed between the pair of top pivot bars and interposed between the pair of bottom pivot bars.

15. The agricultural conveyor of claim 14, wherein the chassis includes a second pair of wheels located on opposite sides of a rear end of the chassis, the chassis drivable on the first and second pair of wheels.

16. An agricultural conveyor, comprising:
a chassis arrangement providing a first pair of wheels;
a conveyor arrangement carried by the chassis; and
a front axle arrangement connected to the chassis, the front axle arrangement providing a second pair of wheels, wherein the agricultural conveyor is drivable on the first and second pairs of wheels, wherein the front axle arrangement comprises:
 a pair of top pivot bars, the pair of top pivot bars connected pivotably to the chassis;
 a pair of bottom pivot bars, the pair of bottom pivot bars connected pivotably to the chassis arrangement; and
 wherein the conveyor arrangement is interposed between the pair of top pivot bars and interposed between the pair of bottom pivot bars.

17. The agricultural conveyor of claim 16, further comprising actuation means connecting the chassis and the front axle arrangement; and
wherein an actuation force from the actuator means applied to the front axle
arrangement raises a front end of the conveyor arrangement and lowers a rear end of the conveyor arrangement.

18. The agricultural conveyor of claim 17, wherein the actuation force is applied to the pair of bottom pivot bars to raise the front end of the conveyor arrangement.

19. The agricultural conveyor of claim 17, the actuation means operable to rotate the chassis about the axis of rotation in a first direction to raise the front end relative to ground and in a second direction to lower the front end.

* * * * *